US010151951B2

(12) United States Patent
Lan

(10) Patent No.: US 10,151,951 B2
(45) Date of Patent: Dec. 11, 2018

(54) LIQUID CRYSTAL MATERIAL, LIQUID CRYSTAL DISPLAY PANEL AND MANUFACTURE METHOD OF LIQUID CRYSTAL DISPLAY PANEL

(71) Applicant: Shenzhen China Star Optoelectronics Technology Co., Ltd., Shenzhen (CN)

(72) Inventor: Song Lan, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 201 days.

(21) Appl. No.: 15/039,419

(22) PCT Filed: May 18, 2016

(86) PCT No.: PCT/CN2016/082555
§ 371 (c)(1),
(2) Date: May 26, 2016

(87) PCT Pub. No.: WO2017/173709
PCT Pub. Date: Oct. 12, 2017

(65) Prior Publication Data
US 2018/0120650 A1    May 3, 2018

(30) Foreign Application Priority Data

Apr. 7, 2016 (CN) .......................... 2016 1 0213472

(51) Int. Cl.
*G02F 1/1337* (2006.01)
*C09K 19/56* (2006.01)
(Continued)

(52) U.S. Cl.
CPC ........ *G02F 1/133703* (2013.01); *C09K 19/56* (2013.01); *G02F 1/133788* (2013.01);
(Continued)

(58) Field of Classification Search
CPC .......... C02F 1/133703; C02F 1/133788; C02F 1/133765; C02F 1/1334;
(Continued)

(56) References Cited

U.S. PATENT DOCUMENTS 6,491,990 B1 *  12/2002  Parri ................... C09K 19/2007
                                                    252/299.64
2007/0258024 A1 *  11/2007  Parri ................... C09K 19/2007
                                                    349/96

FOREIGN PATENT DOCUMENTS

CN          103619993 A        3/2014
CN          105316008 A        2/2016

* cited by examiner

Primary Examiner — Ruiyun Zhang
(74) Attorney, Agent, or Firm — Leong C. Lei

(57) ABSTRACT

Disclosed are a liquid crystal material, a liquid crystal display panel and a manufacture method of a liquid crystal display panel. The liquid crystal material comprises liquid crystal molecules, and photosensitive vertical alignment material mixed thereamong, and the photosensitive vertical alignment material comprises a head group A, a middle base group Sp, a photosensitive base group B and a tail group R. The head group A is anchored on the substrate so that the entire molecules are aligned perpendicular with the substrate, and a photo reaction takes place to the photosensitive base group B by being irradiated with the ultraviolet light from the tilted direction, which leads to the alignment direction change of the entire molecules to be aligned on the substrate with a certain tilted angle according to the irradiation direction of the ultraviolet light. The liquid crystal molecules at the surfaces of the substrate have a pre-tilted angle.

4 Claims, 6 Drawing Sheets

(51) Int. Cl.
    *G02F 1/1339*      (2006.01)
    *C09K 19/04*       (2006.01)
(52) U.S. Cl.
    CPC .... *C09K 2019/0444* (2013.01); *G02F 1/1339* (2013.01); *G02F 2001/133742* (2013.01)
(58) Field of Classification Search
    CPC ........ C02F 2001/133742; C09K 19/56; C09K 19/54; Y10T 428/10; Y10T 428/1005; Y10T 428/1036
    USPC ....... 428/1.1, 1.2, 1.3; 430/20; 349/117, 118
    See application file for complete search history.

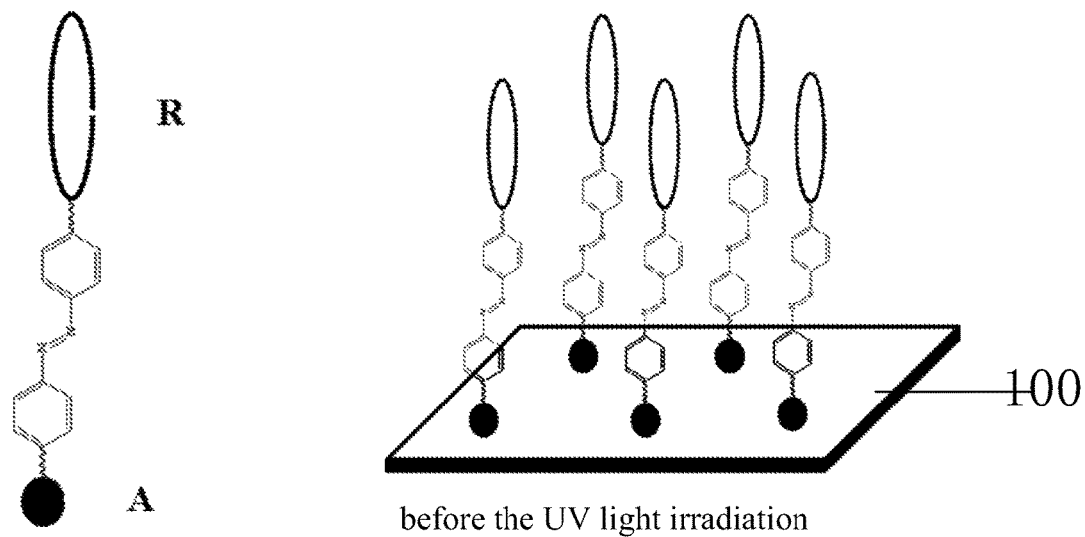
Fig. 1A
before the UV light irradiation
Fig. 1B
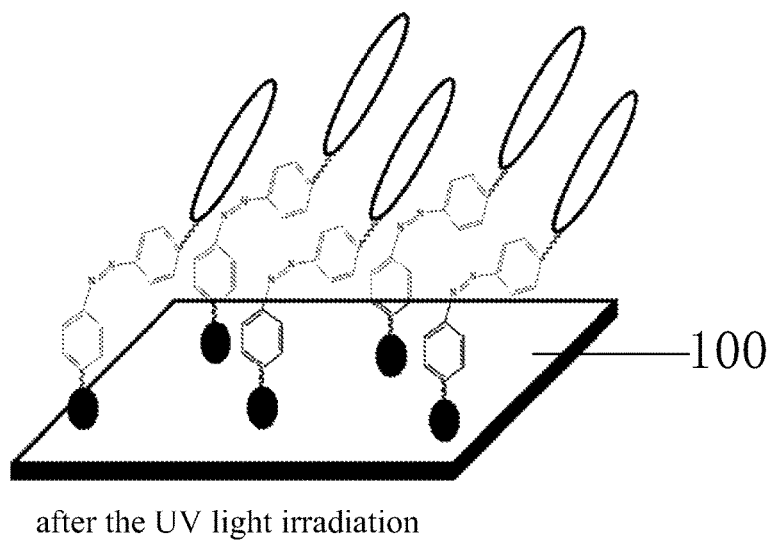
after the UV light irradiation
Fig. 1C before the UV light irradiation after the UV light irradiation step 1, providing an upper substrate (10), a lower substrate (20) and a liquid crystal material; dispensing the liquid crystal material on the upper substrate (10) or the lower substrate (20), and coating seal glue (40) at periphery of the upper substrate (10) or the lower substrate (20), and then assembling and attaching the upper substrate (10) and the lower substrate (20) to obtain a liquid crystal layer (30); the liquid crystal material comprises liquid crystal molecules (31), and photosensitive vertical alignment material (33); — 1 step 2, implementing ultraviolet light irradiation to the liquid crystal material to make the liquid crystal molecules (31) close to the surfaces of the upper substrate (10) and the lower substrate (20) have a pre-tilted angle for accomplishing manufacture of the liquid crystal panel. — 2

Fig. 4

LIQUID CRYSTAL MATERIAL, LIQUID CRYSTAL DISPLAY PANEL AND MANUFACTURE METHOD OF LIQUID CRYSTAL DISPLAY PANEL

FIELD OF THE INVENTION

The present invention relates to a display technology field, and more particularly to a liquid crystal material, a liquid crystal display panel and a manufacture method of a liquid crystal display panel.

BACKGROUND OF THE INVENTION

With the development of display technology, the flat panel device, such as Liquid Crystal Display (LCD) possesses advantages of high image quality, power saving, thin body and wide application scope. Thus, it has been widely applied in various consumer electrical products, such as mobile phone, television, personal digital assistant, digital camera, notebook, laptop, and becomes the major display device.

Most of the liquid crystal displays on the present market are back light type liquid crystal displays, which comprise a liquid crystal display panel and a back light module. The working principle of the liquid crystal display panel is to locate liquid crystal molecules between two parallel glass substrates, and a plurality of vertical and horizontal tiny electrical wires are between the two glass substrates. The light of back light module is reflected to generate images by applying driving voltages to control whether the liquid crystal molecules to be changed directions.

Generally, the liquid crystal display panel comprises a CF (Color Filter) substrate, a TFT (Thin Film Transistor) substrate, a LC (Liquid Crystal) sandwiched between the CF substrate and the TFT substrate and sealant.

There is one layer of thin film material on the CF substrate and the TFT substrate of the TN (Twisted nematic) type or STN (Super twisted nematic) type liquid crystal display panel, which mainly makes the liquid crystal molecules to be aligned in a certain direction, and is so called the alignment film. Generally, the material of the alignment film is polyimide (PI) material, comprising the rubbing alignment type PI material or the light alignment type PI material. However, either of the alignment materials has the drawback itself. First, the rubbing alignment type PI material can easily causes issues of powder particles, residual electrostatic and brush marks to reduce the process yield. Although the light alignment type PI material can avoid these problems, with the restriction of the material properties, the heat resistance and the aging resistance are poor, and meanwhile, the LC anchoring ability is weaker, and the quality of the panel is lowered; second, the PI material itself has high polarity and high water absorption. The storage and the delivery can easily change the property to result in the nonuniform alignment, and the price of the PI material is expensive, and the film formation process on the TFT-LCD is more complicated, which leads to the increase of the panel cost.

At present, the common VA (Vertical Alignment) type display panel is the PSVA (Polymer stabilized vertical alignment) mode. The liquid crystal display panel of this mode needs to add one or few kinds of polymeric monomers in the liquid crystal material, and to be irradiated with the ultraviolet light to make the polyreaction take place to form the protruding objects guiding the direction of the liquid crystal to be deposited on the substrate surface, which is beneficial for the liquid crystal to have specific Pre-angle for implementing orientation and alignment as driving liquid crystal. However, the issue of this technology is that the problems of uniformity, residual quantity of this polymeric monomer will influence the quality of the panel; meanwhile, in this PSVA type liquid crystal display panel, it is also required to implement processes of exposure, development, etching to the ITO at the TFT side for generating the pattern of fish bond, and the process is complicated; besides, the polymeric monomers in the PSVA type liquid crystal display panel requires two times of ultraviolet (UV) light irradiation to accomplish the polymerization, and the production cost is higher.

SUMMARY OF THE INVENTION

An objective of the present invention is to provide a liquid crystal material, in which the photosensitive vertical alignment material mixed among the liquid crystal molecules to act the function of liquid crystal alignment to decrease the production cost of the liquid crystal display panel.

Another objective of the present invention is to provide a liquid crystal display panel, which does not need the alignment film, and the structure is simple, and the production cost is low.

Another objective of the present invention is to provide a manufacture method of a liquid crystal display panel, which eliminates the alignment film manufacture process, and the manufacture process is simple to decrease the production cost and to promote the capacity, and the alignment result of the liquid crystal molecules is great.

For realizing the aforesaid objectives, the present invention first provides a liquid crystal material, comprising liquid crystal molecules, and photosensitive vertical alignment material mixed among the liquid crystal molecules, and a constitutional formula of the photosensitive vertical alignment material is A-Sp-B-Sp-R, wherein A is a polar groups containing one or more of N, S, O and Si atoms;

Sp is —CH=CH—, —C≡C—, phenyl, cycloalkyl, —O—, —S—, —CO—, —CO—O—, —OCO—, —CH$_2$S—, —CF$_2$O—, —OCF$_2$—, —CF$_2$S—, —(CH$_2$)$_n$—, a group, of which some C atom in the —(CH$_2$)$_n$— group is replaced by phenyl, hexamethylene, or one or more combinations of cycloalkyl and alkylene, or a group of which some H atom in the —(CH$_2$)$_n$— group is replaced by F atom; in the —(CH$_2$)$_n$— group, n=1, 2, 3 or 4;

B is one or more photosensitive groups, and a constitutional formula of the photosensitive group is

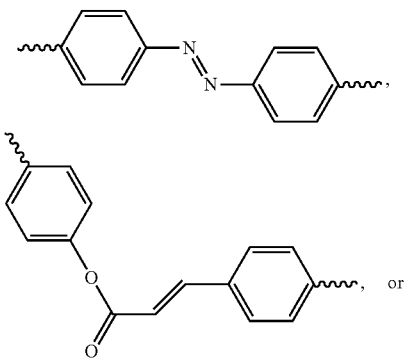

-continued

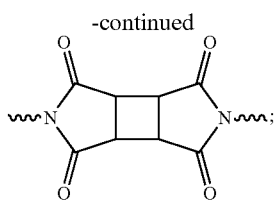

R is a linear or chain branched alkyl having 5-20 C atoms, a first group obtained after some $CH_2$ group in the alkyl is replaced by phenyl, cycloalkyl, —CONH—, —COO—, —O—CO—, —S—, —CO— or —CH=CH— group, a second group obtained after some H atom in the alkyl is replaced by F or Cl atom, or a third group obtained after some H atom in the first group is replaced by F or Cl atom.

The group A is —OH or —NH.

A mass percentage of the photosensitive vertical alignment material in the liquid crystal material is 1 wt %-5 wt %.

The photosensitive vertical alignment material is one or more of following compounds:

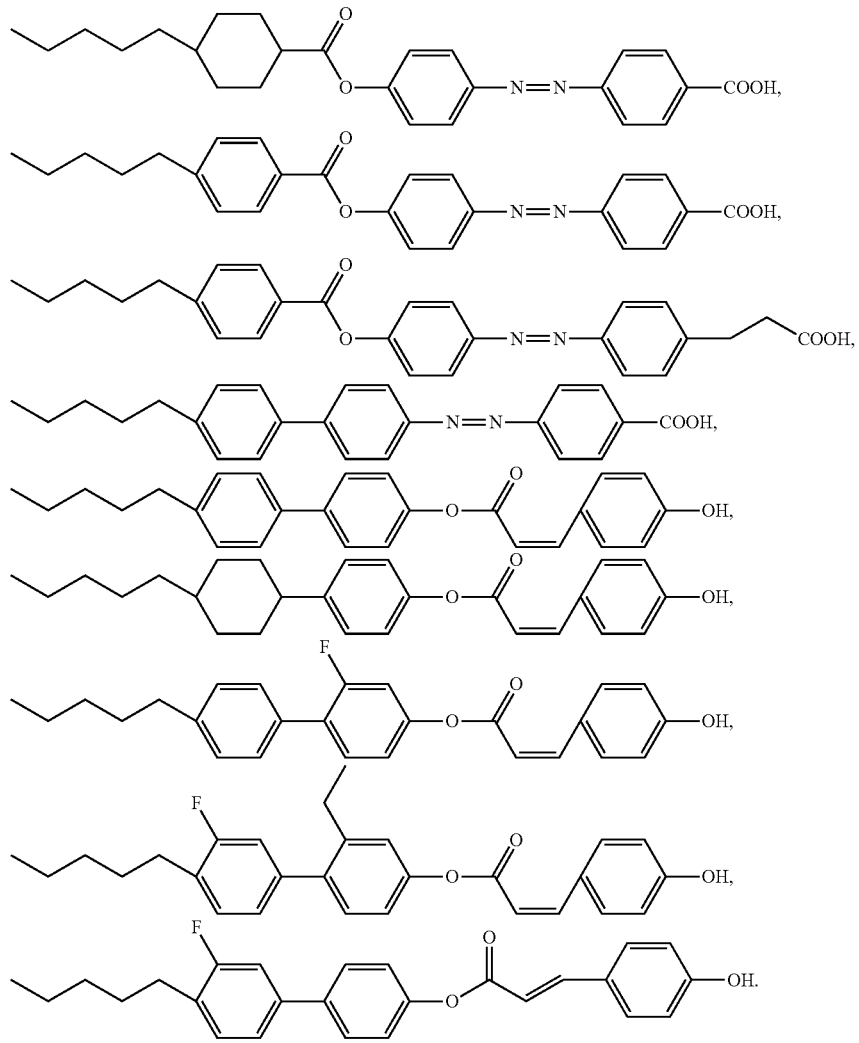

The present invention further provides a liquid crystal display panel, comprising an upper substrate and a lower substrate which are oppositely located, and a liquid crystal layer arranged between the upper substrate and the lower substrate;

material of the liquid crystal layer is the aforesaid liquid crystal material.

The present invention further provides a manufacture method of a liquid crystal display panel, comprising steps of:

step 1, providing an upper substrate, a lower substrate and a liquid crystal material;

the liquid crystal material comprises liquid crystal molecules, and photosensitive vertical alignment material mixed among the liquid crystal molecules, and a constitutional formula of the photosensitive vertical alignment material is A-Sp-B-Sp-R, wherein A is a polar groups containing one or more of N, S, O and Si atoms;

Sp is —CH=CH—, —C≡C—, phenyl, cycloalkyl, —O—, —S—, —CO—, —CO—O—, —OCO—, —CH$_2$S—, —CF$_2$O—, —OCF$_2$—, —CF$_2$S—, —(CH$_2$)$_n$—, a group, of which some C atom in the —(CH$_2$)$_n$— group is replaced by phenyl, hexamethylene, or one or more combinations of cycloalkyl and alkylene, or a group of which some H atom in the —(CH$_2$)$_n$— group is replaced by F atom; in the —(CH$_2$)$_n$— group, n=1, 2, 3 or 4;

B is one or more photosensitive groups, and a constitutional formula of the photosensitive group is

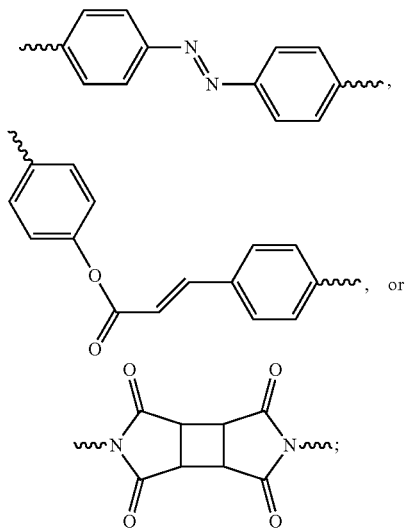

R is a linear or chain branched alkyl having 5-20 C atoms, a first group obtained after some $CH_2$ group in the alkyl is replaced by phenyl, cycloalkyl, —CONH—, —COO—, —O—CO—, —S—, —CO— or —CH=CH— group, a second group obtained after some H atom in the alkyl is replaced by F or Cl atom, or a third group obtained after some H atom in the first group is replaced by F or Cl atom;

dispensing the liquid crystal material on the upper substrate or the lower substrate, and coating seal glue at periphery of the upper substrate or the lower substrate, and then assembling and attaching the upper substrate and the lower substrate, and solidifying the seal glue to obtain a liquid crystal layer between the upper substrate and the lower substrate;

then, the photosensitive vertical alignment material is attached on surfaces of the upper substrate and the lower substrate with the base group A of itself, and aligned perpendicular with the surfaces of the upper substrate and the lower substrate, and thus to guide the liquid crystal molecules to be aligned perpendicular with the upper substrate and the lower substrate;

step 2, implementing ultraviolet light irradiation to the liquid crystal material from one side of the upper substrate or the lower substrate, and an irradiation direction of the ultraviolet light appears a certain tilted angle with the upper substrate and the lower substrate, and after being irradiated with the ultraviolet light from a tilted direction, a photo reaction takes place to the group B in the photosensitive vertical alignment material to change an alignment direction of the photosensitive vertical alignment material to be aligned on the upper substrate and the lower substrate with the certain tilted angle according to the irradiation direction of the ultraviolet light, and thus to make the liquid crystal molecules close to the surfaces of the upper substrate and the lower substrate have a pre-tilted angle for accomplishing manufacture of the liquid crystal panel.

The group A is —OH or —NH.

A mass percentage of the photosensitive vertical alignment material in the liquid crystal material is 1 wt %-5 wt %.

The photosensitive vertical alignment material is one or more of following compounds:

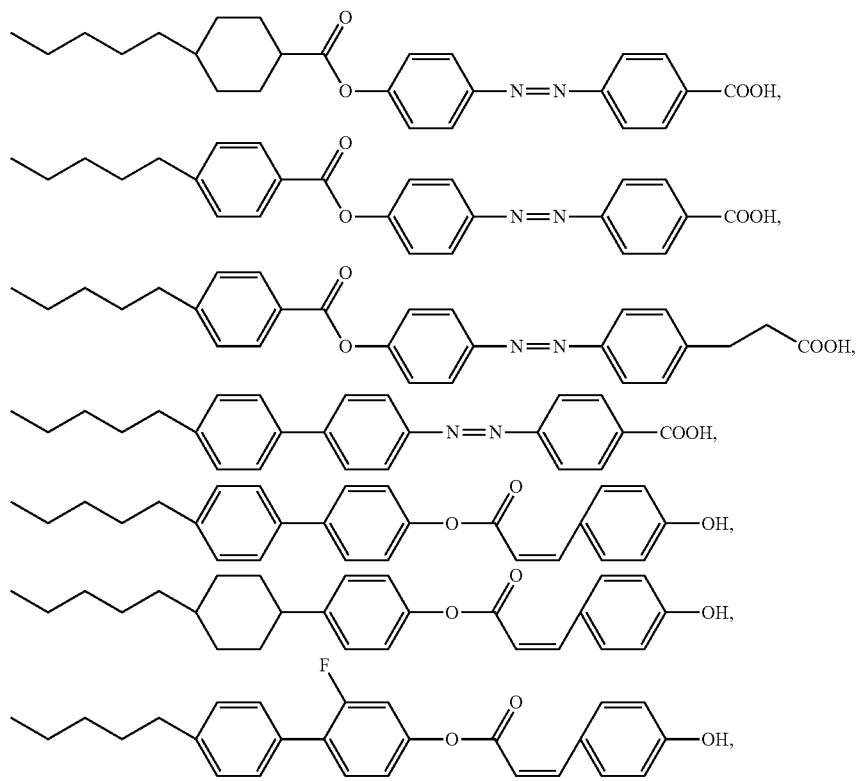

-continued

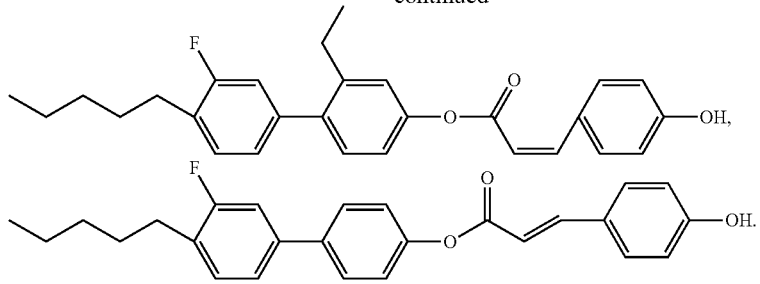

The upper substrate is a TFT substrate, and the lower substrate is a CF substrate; in the step 2, the ultraviolet light irradiation is implemented to the liquid crystal material from one side of the upper substrate.

In the step 2, a wavelength of the ultraviolet light is 320-400 nm, and an illuminancy is 1-100 mW/cm$^2$, and an irradiation period is 5-30 min.

The benefits of the present invention are: the present invention provides a liquid crystal material, and the photosensitive vertical alignment material is mixed among the liquid crystal molecules to act the function of liquid crystal alignment. The present invention provides a liquid crystal display panel, which utilizes the aforesaid liquid crystal material. In comparison with the TN type or the STN type liquid crystal display panel, the alignment film can be eliminated to decrease the production cost. In comparison with the PSVA type liquid crystal display panel, the polymeric monomers in the PSVA liquid crystal can be eliminated, and meanwhile, one UV light process is omitted. The etching process of the pixel electrode is simplified and the production cost is decreased. The present invention provides a manufacture method of a liquid crystal display panel, in which the manufacture process is simple. In comparison with the TN type or the STN type liquid crystal display panel, the alignment film can be eliminated to decrease the production cost. In comparison with the PSVA type liquid crystal display panel, one UV light process is omitted. The etching process of the pixel electrode is simplified and the production cost is decreased. The liquid crystal alignment result of the manufactured liquid crystal display panel is good.

In order to better understand the characteristics and technical aspect of the invention, please refer to the following detailed description of the present invention is concerned with the diagrams, however, provide reference to the accompanying drawings and description only and is not intended to be limiting of the invention.

BRIEF DESCRIPTION OF THE DRAWINGS

The technical solution and the beneficial effects of the present invention are best understood from the following detailed description with reference to the accompanying figures and embodiments.

In drawings,

FIG. 1A is a structure diagram of a kind of compound of the photosensitive vertical alignment material in the liquid crystal material of the present invention;

FIG. 1B is a diagram that the photosensitive vertical alignment material in FIG. 1A is aligned perpendicular with the substrate before the ultraviolet light irradiation;

FIG. 1C is a diagram that the photosensitive vertical alignment material in FIG. 1A is aligned on the substrate with a certain tilted angle after the ultraviolet light irradiation;

FIG. 4 is a flowchart of a manufacture method of a liquid crystal display panel of the present invention;

DETAILED DESCRIPTION OF PREFERRED EMBODIMENTS

For better explaining the technical solution and the effect of the present invention, the present invention will be further described in detail with the accompanying drawings and the specific embodiments.

Figure 3:
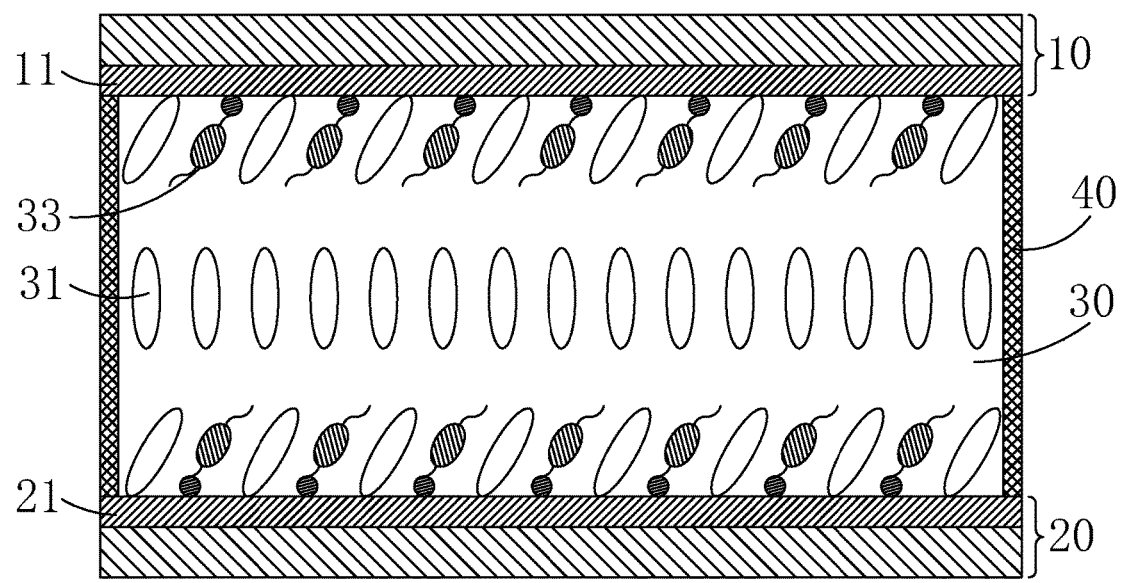
FIG. 3 is a structure diagram of a liquid crystal display panel of the present invention.

Please refer to FIG. 3. The present invention first provides a liquid crystal material comprising liquid crystal molecules 31, and photosensitive vertical alignment material 33 mixed among the liquid crystal molecules 31, and a constitutional formula of the photosensitive vertical alignment material 33 is A-Sp-B-Sp-R, wherein A is a polar groups containing one or more of N, S, O and Si atoms;

Sp is —CH=CH—, —C≡C—, phenyl, cycloalkyl, —O—, —S—, —CO—, —CO—O—, —OCO—, —CH$_2$S—, —CF$_2$O—, —OCF$_2$—, —CF$_2$S—, —(CH$_2$)$_n$—, a group, of which some C atom in the —(CH$_2$)$_n$— group is replaced by phenyl, hexamethylene, or one or more combinations of cycloalkyl and alkylene, or a group of which some H atom in the —(CH$_2$)$_n$— group is replaced by F atom; in the —(CH$_2$)$_n$— group, n=1, 2, 3 or 4;

B is one or more photosensitive groups, and a constitutional formula of the photosensitive group is

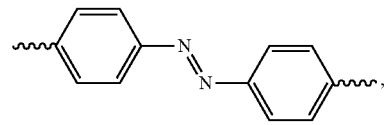

-continued

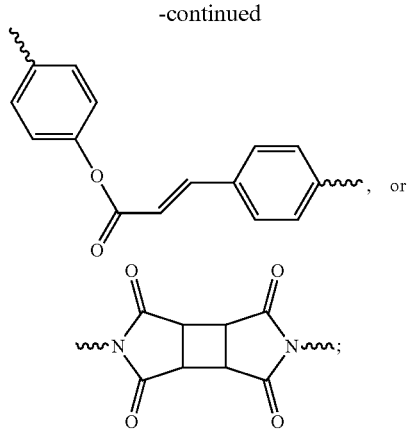

Figure 2A:
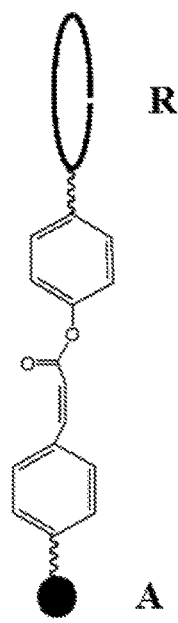
FIG. 2A is a structure diagram of another kind of compound of the photosensitive vertical alignment material in the liquid crystal material of the present invention.

R is a linear or chain branched alkyl having 5-20 C atoms, a first group obtained after some $CH_2$ group in the alkyl is replaced by phenyl, cycloalkyl, —CONH—, —COO—, —O—CO—, —S—, —CO— or —CH=CH— group, a second group obtained after some H atom in the alkyl is replaced by F or Cl atom, or a third group obtained after some H atom in the first group is replaced by F or Cl atom. As shown in FIG. 1A and FIG. 2A, the photosensitive vertical alignment material 33 of the present invention comprises two types of azo photo-isomerization small molecules and photo polymerization small molecules.

As shown in FIG. 1A, which is a kind of azo photo-isomerization small molecules, after the azo photo-isomerization small molecules are mixed in the liquid crystal, and before the UV light irradiation, the structures of the azo photo-isomerization small molecules are anti-form, and they can be attached on surface of the substrate 100 with the head group A of themselves, and are perpendicular with the surface of the substrate 100 (as shown in FIG. 1B) to guide the liquid crystal molecules to be aligned perpendicularly. Once the ultraviolet (UV) light irradiation is implemented in the tilted direction, the photo reaction will take place to the photosensitive base groups of the azo photo-isomerization small molecules. As shown in FIG. 1C, the structures of the azo photo-isomerization small molecules become cis-form from the anti-form, and the alignment direction is changed to be aligned on the substrate 100 with the certain tilted angle according to the irradiation direction of the ultraviolet light and thus, the liquid crystal molecules close to the surface of the substrate 100 have a pre-tilted angle.

Figure 2B:
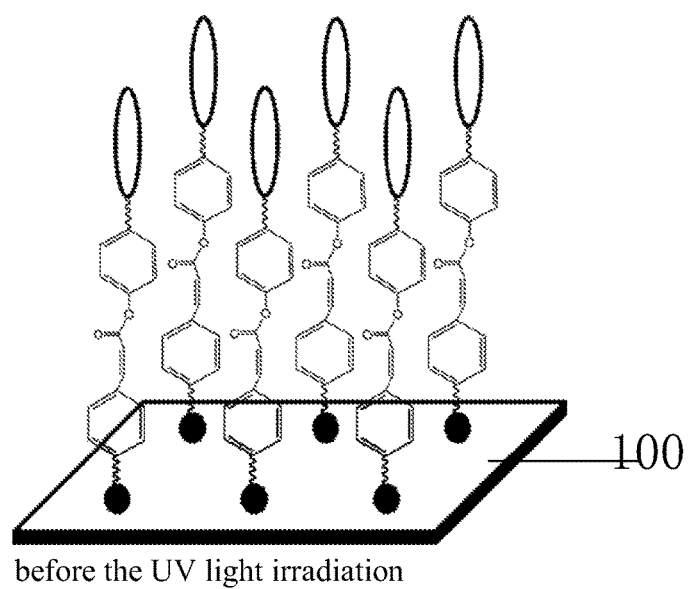
FIG. 2B is a diagram that the photosensitive vertical alignment material in FIG. 2A is aligned perpendicular with the substrate before the ultraviolet light irradiation.
Figure 2C:
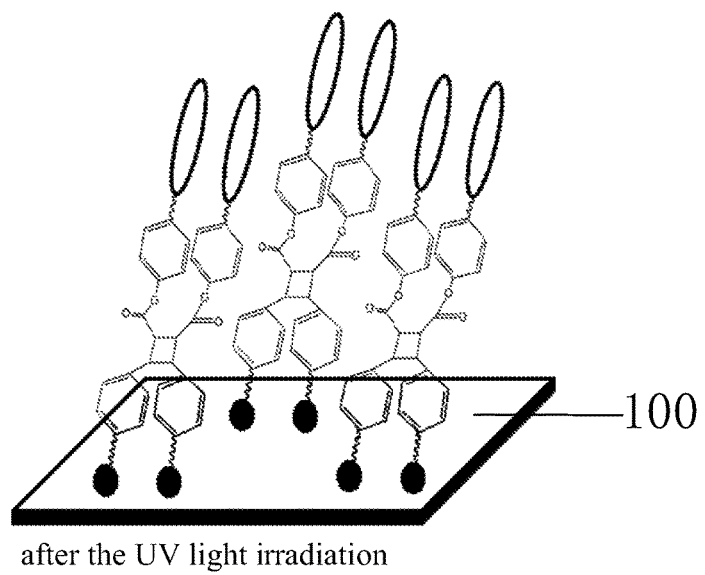
FIG. 2C is a diagram that the photosensitive vertical alignment material in FIG. 2A is aligned on the substrate with a certain tilted angle after the ultraviolet light irradiation.

As shown in FIG. 2A, which is a kind of photo polymerization small molecules, and after the photo polymerization small molecules are mixed in the liquid crystal, and before the UV light irradiation, the structures of the photo polymerization small molecules can be attached on surface of the substrate 100 with the head group A of themselves, and are perpendicular with the surface of the substrate 100 (as shown in FIG. 2B) to guide the liquid crystal molecules to be aligned perpendicularly. Once the ultraviolet (UV) light irradiation is implemented in the tilted direction, the photo reaction will take place to the photosensitive base groups of the photo polymerization small molecules. The 2+2 cycloaddition will take place among the adjacent photo polymerization small molecules, and the alignment direction of the photo polymerization small molecules is changed to be aligned on the substrate 100 with the certain tilted angle according to the irradiation direction of the ultraviolet light (as shown in FIG. 2C) and thus, the liquid crystal molecules close to the surface of the substrate 100 have a pre-tilted angle.

Preferably, the photosensitive vertical alignment material 33 in the liquid crystal material is one or more of following compounds:

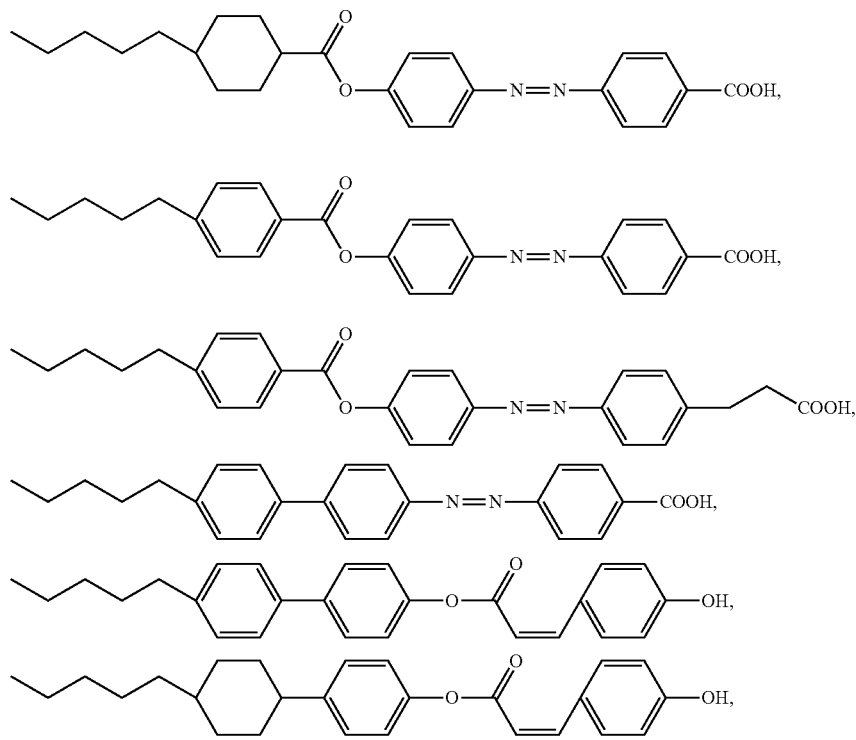

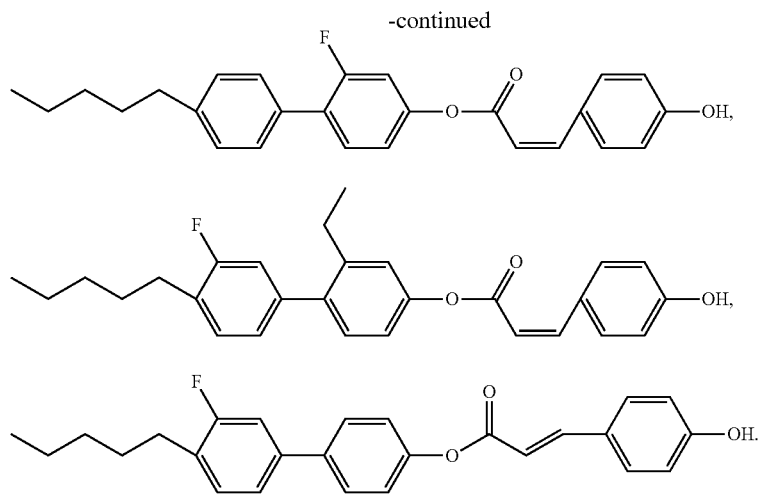

Specifically, a mass percentage of the photosensitive vertical alignment material 33 in the liquid crystal material is 1 wt %-5 wt %.

On the basis of the liquid crystal material, referring to FIG. 3, the present invention provides a liquid crystal display panel, comprising an upper substrate 10 and a lower substrate 20 which are oppositely located, and a liquid crystal layer 30 arranged between the upper substrate 10 and the lower substrate 20; material of the liquid crystal layer is the aforesaid liquid crystal material, comprising liquid crystal molecules 31, and photosensitive vertical alignment material 33 mixed among the liquid crystal molecules 31, and a constitutional formula of the photosensitive vertical alignment material 33 is A-Sp-B-Sp-R, wherein A is a polar groups containing one or more of N, S, O and Si atoms;

Sp is —CH═CH—, —C≡C—, phenyl, cycloalkyl, —O—, —S—, —CO—, —CO—O—, —OCO—, —CH$_2$S—, —CF$_2$O—, —OCF$_2$—, —CF$_2$S—, —(CH$_2$)$_n$—, a group, of which some C atom in the —(CH$_2$)$_n$— group is replaced by phenyl, hexamethylene, or one or more combinations of cycloalkyl and alkylene, or a group of which some H atom in the —(CH$_2$)$_n$— group is replaced by F atom; in the —(CH$_2$)$_n$— group, n=1, 2, 3 or 4;

B is one or more photosensitive groups, and a constitutional formula of the photosensitive group is R is a linear or chain branched alkyl having 5-20 C atoms, a first group obtained after some CH$_2$ group in the alkyl is replaced by phenyl, cycloalkyl, —CONH—, —COO—, —O—CO—, —S—, —CO— or —CH═CH— group, a second group obtained after some H atom in the alkyl is replaced by F or Cl atom, or a third group obtained after some H atom in the first group is replaced by F or Cl atom.

Specifically, in the photosensitive vertical alignment material 33, A is equivalent to the head group, which can be anchored on the upper, lower substrates 10, 20 to make the entire molecules be aligned perpendicular with the upper, lower substrates 10, 20 to act the function of the vertical alignment; Sp is the middle base group; B is the photosensitive base group, and a photo reaction takes place to the photosensitive base group by being irradiated with the UV light from the tilted direction so that the structure of the photosensitive vertical alignment material 33 itself changes or the reaction takes place among the molecules, which leads to the alignment direction change of the entire molecules of the photosensitive vertical alignment material 33 to be aligned on the upper, lower substrates 10, 20 with a certain tilted angle according to the irradiation direction of the UV light, and thus, the liquid crystal molecules 31 at the surfaces of the upper, lower substrates 10, 20 have a pre-tilted angle; R is the tail group, which acts the function of the PI branch to perpendicularly align the liquid crystal molecules 31 in the steric hindrance manner.

Preferably, the photosensitive vertical alignment material 33 in the liquid crystal material is one or more of following compounds:

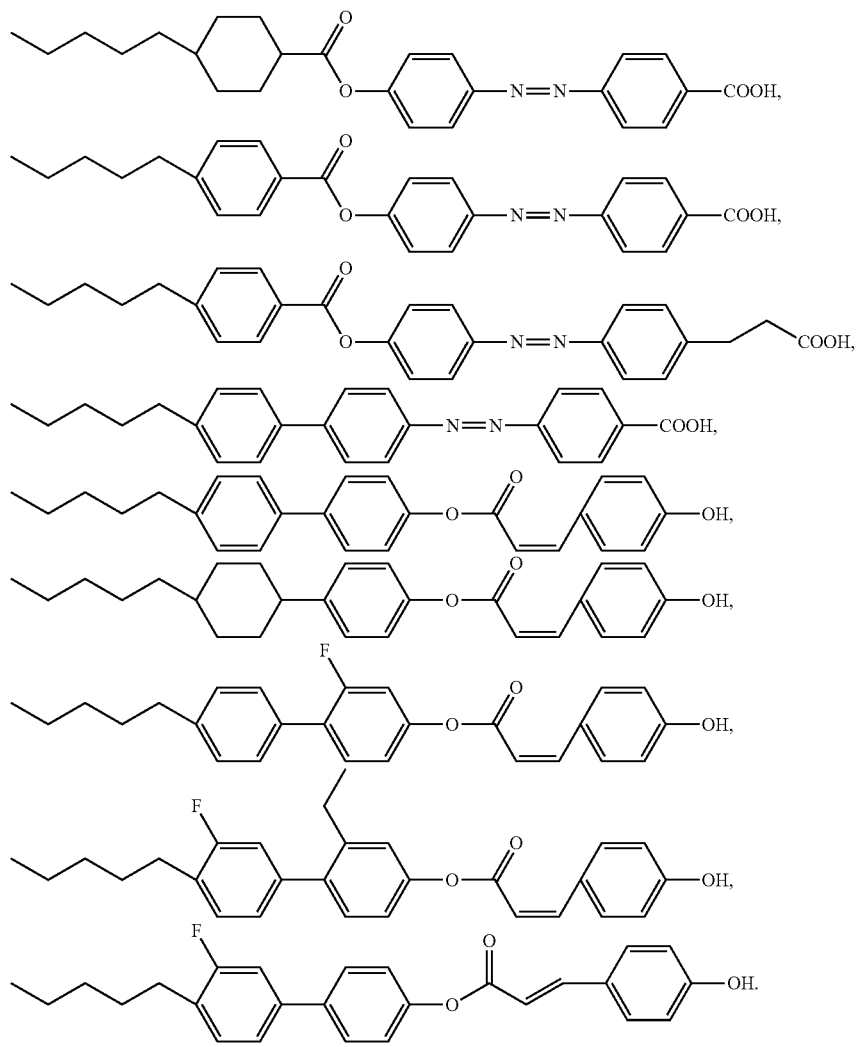

Specifically, a mass percentage of the photosensitive vertical alignment material 33 in the liquid crystal material is 1 wt %-5 wt %.

Specifically, the liquid crystal display panel further comprises seal glue 40 located between the upper substrate 10 and the lower substrate 20. Preferably, the liquid crystal display panel further comprises conductive glue (not shown) at periphery of the seal glue 40.

Specifically, the upper substrate 10 is a TFT substrate, and the lower substrate 20 is a CF substrate, and a pixel electrode 11 is provided to one side of the upper substrate 10 close to the liquid crystal layer 30, and a common electrode 21 is provided to one side of the lower substrate 20 close to the liquid crystal layer 30.

Specifically, the material of the pixel electrode 11 and the common electrode 21 can be metal oxide, or non metal material which is conductive. Preferably, the metal oxide can be $In_2O_3$:Sn (ITO), ZnO:In (IZO), ZnO:Ga (GZO), ZnO:Al (AZO); the metal can be Ag, Au, Pt, Cu, Al or Cr; the non metal material which is conductive can be graphene.

In the aforesaid liquid crystal display panel, the photosensitive vertical alignment material is mixed among the liquid crystal molecules to act the function of the liquid crystal alignment. In comparison with the TN type or the STN type liquid crystal display panel, the alignment film can be eliminated to decrease the production cost. In comparison with the PSVA type liquid crystal display panel, the polymeric monomers in the PSVA liquid crystal can be eliminated, and meanwhile, one UV light process is omitted. The etching process of the pixel electrode is simplified and the production cost is decreased.

Figure 5:
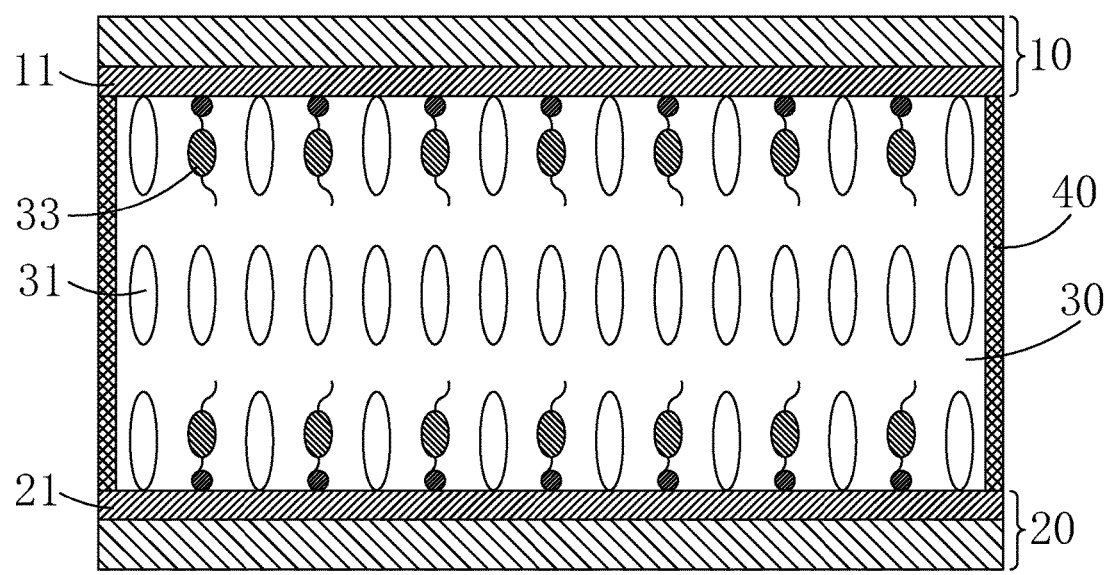
FIG. 5 is a diagram of the step 1 of a manufacture method of a liquid crystal display panel of the present invention.
Figure 6:
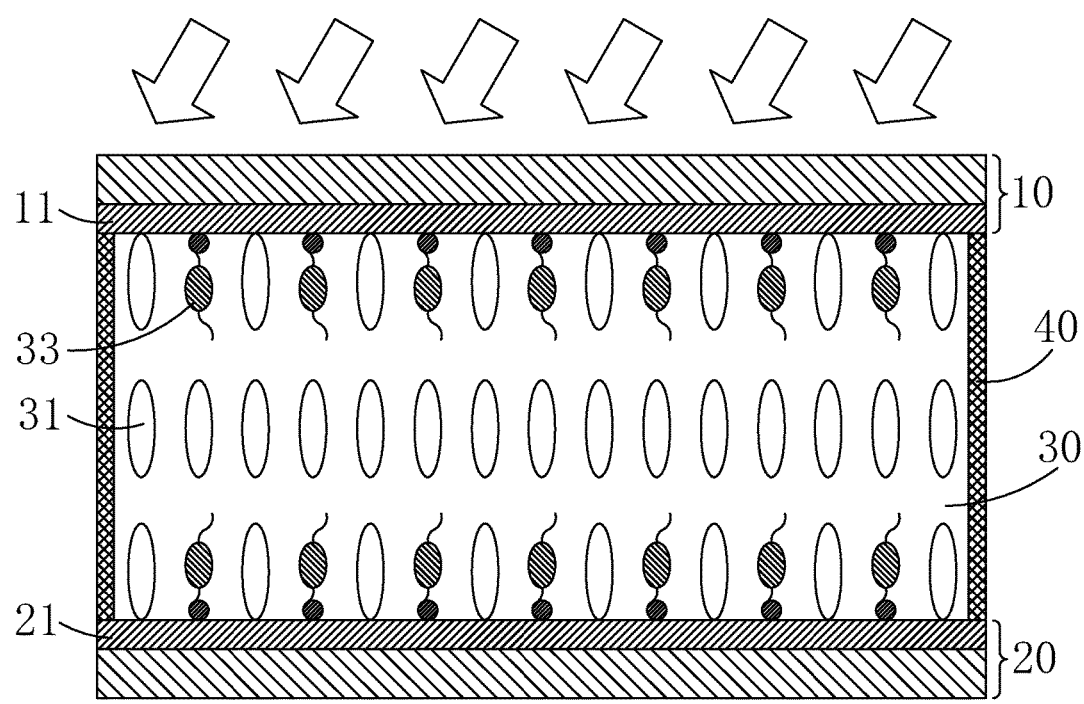
FIG. 6 is a diagram of the step 2 of a manufacture method of a liquid crystal display panel of the present invention.

Please refer to FIGS. 4-6 with referring to FIG. 3 at the same time, the present invention further provides a manufacture method of a liquid crystal display panel, comprising steps of:

step 1, as shown in FIG. 5, providing an upper substrate 10, a lower substrate 20 and a liquid crystal material;

The liquid crystal material comprises liquid crystal molecules 31, and photosensitive vertical alignment material 33 mixed among the liquid crystal molecules 31, and a constitutional formula of the photosensitive vertical alignment material 33 is A-Sp-B-Sp-R, wherein A is a polar groups containing one or more of N, S, O and Si atoms;

Sp is —CH=CH—, —C≡C—, phenyl, cycloalkyl, —O—, —S—, —CO—, —CO—O—, —OCO—, —$CH_2$S—, —$CF_2$O—, —$OCF_2$—, —$CF_2$S—, —($CH_2$)$_n$—, a group, of which some C atom in the —($CH_2$)$_n$— group is replaced by phenyl, hexamethylene, or one or more combinations of cycloalkyl and alkylene, or a group of which some H atom in the —(CH$_2$)$_n$— group is replaced by F atom; in the —(CH$_2$)$_n$— group, n=1, 2, 3 or 4;

B is one or more photosensitive groups, and a constitutional formula of the photosensitive group is

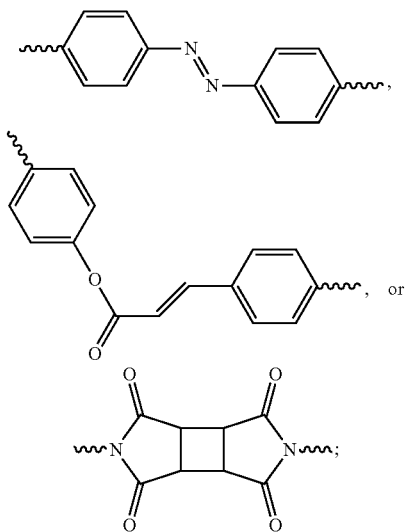

R is a linear or chain branched alkyl having 5-20 C atoms, a first group obtained after some CH$_2$ group in the alkyl is replaced by phenyl, cycloalkyl, —CONH—, —COO—, —O—CO—, —S—, —CO— or —CH=CH— group, a second group obtained after some H atom in the alkyl is replaced by F or Cl atom, or a third group obtained after some H atom in the first group is replaced by F or Cl atom;

dispensing the liquid crystal material on the upper substrate 10 or the lower substrate 20, and coating seal glue 40 at periphery of the upper substrate 10 or the lower substrate 20, and then assembling and attaching the upper substrate 10 and the lower substrate 20, and solidifying the seal glue 40 to obtain a liquid crystal layer 30 between the upper substrate 10 and the lower substrate 20;

then, the photosensitive vertical alignment material 33 is attached on surfaces of the upper substrate 10 and the lower substrate 20 with the base group A of itself, and aligned perpendicular with the surfaces of the upper substrate 10 and the lower substrate 20 (as shown in FIG. 6), and thus to guide the liquid crystal molecules 31 to be aligned perpendicular with the upper substrate 10 and the lower substrate 20.

Specifically, a mass percentage of the photosensitive vertical alignment material 33 in the liquid crystal material is 1 wt %-5 wt %.

Preferably, the photosensitive vertical alignment material 33 in the liquid crystal material is one or more of following compounds:

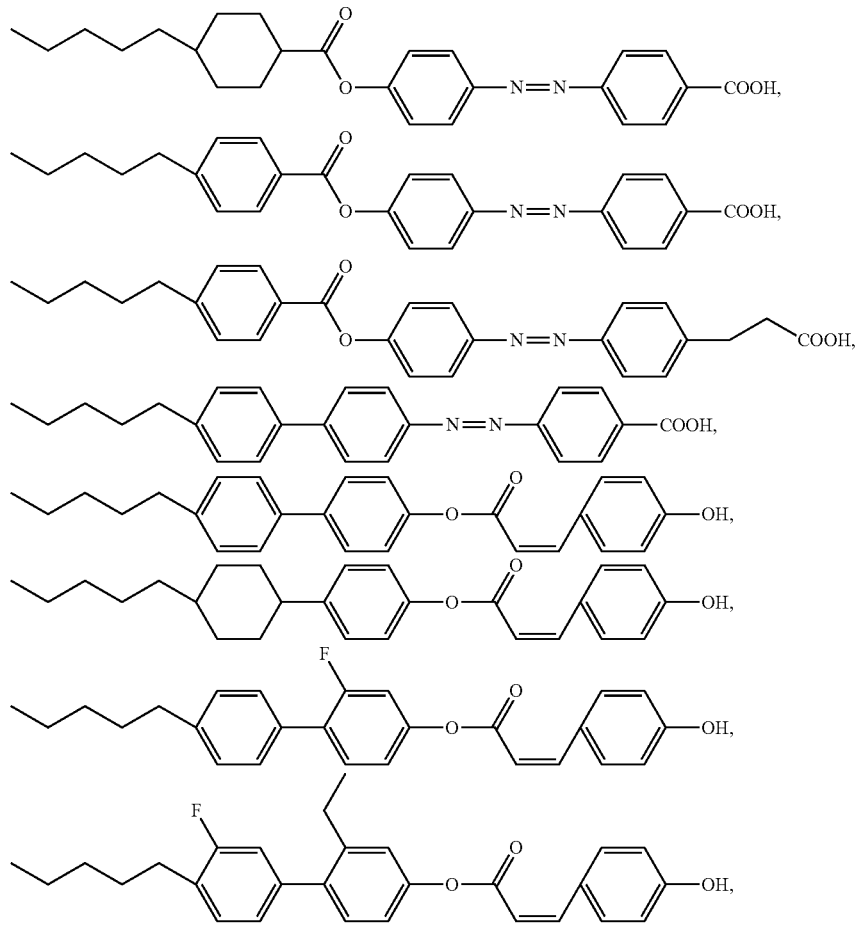

-continued

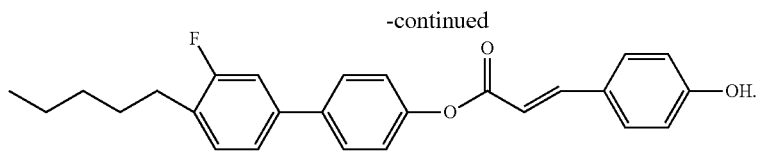

Specifically, in the step 1, the seal glue 40 is solidified by utilizing heating or ultraviolet light irradiation.

Preferably, in the step 1, after coating the seal glue 40 at periphery of the lower substrate 20 or the upper substrate 10, conductive glue (not shown) is coated at periphery of the seal glue 40.

Preferably, in the step 1, the upper substrate 10 and the lower substrate 20 are assembled and attached in a vacuum environment.

Specifically, the upper substrate 10 is a TFT substrate, and the lower substrate 20 is a CF substrate, and a pixel electrode 11 is provided to one side of the upper substrate 10 close to the liquid crystal layer 30, and a common electrode 21 is provided to one side of the lower substrate 20 close to the liquid crystal layer 30.

Specifically, the material of the pixel electrode 11 and the common electrode 21 can be metal oxide, or non metal material which is conductive. Preferably, the metal oxide can be $In_2O_3$:Sn (ITO), ZnO:In (IZO), ZnO:Ga (GZO), ZnO:Al (AZO); the metal can be Ag, Au, Pt, Cu, Al or Cr; the non metal material which is conductive can be graphene.

step 2, as shown in FIG. 6, implementing ultraviolet light irradiation to the liquid crystal material from one side of the upper substrate 10 or the lower substrate 20, and an irradiation direction of the ultraviolet light appears a certain tilted angle with the upper substrate 10 and the lower substrate 20, and after being irradiated with the ultraviolet light from a tilted direction, a photo reaction takes place to the group B in the photosensitive vertical alignment material 33 to change an alignment direction of the photosensitive vertical alignment material 33 to be aligned on the upper substrate 10 and the lower substrate 20 with the certain tilted angle according to the irradiation direction of the ultraviolet light, and thus to make the liquid crystal molecules 31 close to the surfaces of the upper substrate 10 and the lower substrate 20 have a pre-tilted angle (as shown in FIG. 3) for accomplishing manufacture of the liquid crystal panel.

Preferably, in the step 2, the ultraviolet light irradiation is implemented to the liquid crystal material from one side of the upper substrate 10 (i.e. the TFT substrate). The reason is that the TFT substrate has higher light transmittance than that of the CF substrate, and the transmittance of the ultraviolet light can be raised to promote the effect of the ultraviolet light irradiation.

Specifically, in the step 2, a wavelength of the ultraviolet light is 320-400 nm, and an illuminancy is 1-100 mW/cm$^2$, and an irradiation period is 5-30 min.

In the aforesaid manufacture method of the liquid crystal display panel, the manufacture process is simple, and the photosensitive vertical alignment material is mixed among the liquid crystal molecules. In comparison with the TN type or the STN type liquid crystal display panel, the alignment film can be eliminated to decrease the production cost. In comparison with the PSVA type liquid crystal display panel, one UV light process is omitted. The etching process of the pixel electrode is simplified and the production cost is decreased. The liquid crystal alignment result of the manufactured liquid crystal display panel is good.

The specific embodiment I and the specific embodiment II are illustrated for demonstration of the manufacture method of the photosensitive vertical alignment material 33:

Specific Embodiment I the manufacture method of compound

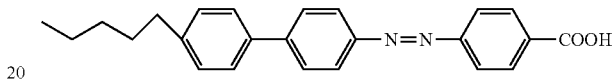

is:

step 1, mixing 4-aminobenzoic acid (I), phenol (II), hydrochloric acid (HCl), sodium nitrite (NaNO$_2$) according to a mole ratio of 4-aminobenzoic acid (I):phenol (II):HCl:NaNO$_2$=1:1-2:1-5:1.01-1.10, and implementing reaction of 3-5 hours under the temperature condition of 0-5° C. to obtain a compound (III);

the reaction formula of the step 1 is:

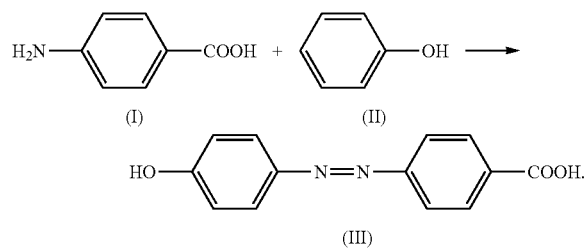

step 2, mixing benzoic acid (IV), thionyl chloride (SOCl$_2$) according to a mole ratio of benzoic acid (1V):SOCl$_2$=1:2-3 to be solved in toluene, and implementing reaction of 15-25 hours under the temperature condition of 100-200° C. to obtain a compound (V);

the reaction formula of the step 2 is:

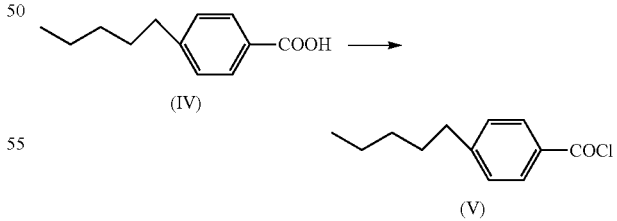

step 3, solving 1 mmol compound (III) in 8mLCH$_2$Cl$_2$, and adding 5 mmol triethylamine in an ice bath condition to obtain the CH$_2$Cl$_2$ solution of compound (III); solving 1-1.5 mmol compound (V) in 4mLCH$_2$Cl$_2$ to obtain the CH$_2$Cl$_2$ solution of compound (V); after mixing the CH$_2$Cl$_2$ solution of compound (III) and the CH$_2$Cl$_2$ solution of compound (V), blending it with 15-25 hours under room temperature, and then cleaning and separating the obtained product with NaOH solution and water, and drying with anhydrous Na₂SO₄ to obtain compound (VI) after recrystallization;
the reaction formula of the step 3 is:

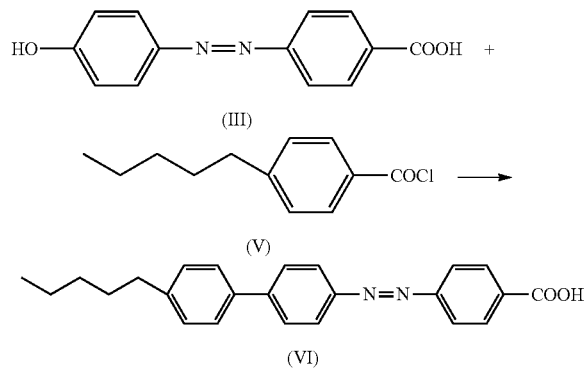

H¹-NMR data of the compound (VI) is: δ: 0.96 (3H, CH₃), 1.33 (2H, CH₂), 1.29 (2H, CH₂), 1.62 (2H, CH₂), 2.55 (2H, CH₂), 7.18 (2H, benz), 7.43 (2H, benz), 7.68 (2H, benz), 7.99 (2H, benz), 8.14 (2H, benz), 8.33 (2H, benz), 11.0 (1H₂OH);

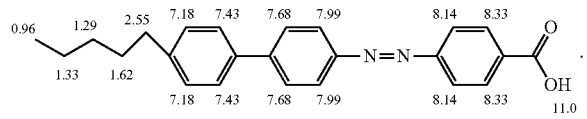

Specific Embodiment II the manufacture method of compound

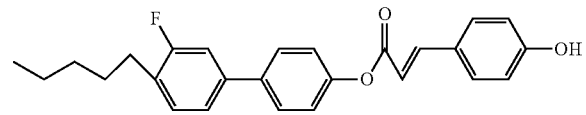 [SMILES: CCCCCc1ccc(-c2ccc(OC(=O)/C=C/c3ccc(O)cc3)cc2)cc1F]

is:

step 1, solving cinnamic acid (VII), p-bromophenol (VIII), 4-DiMethylaMinopyridine (DMAP) according to a mole ratio of cinnamic acid (VII), p-bromophenol (VIII), 4-DiMethylaMinopyridine (DMAP)=1:1.1-1.2:0.05 in CH₂Cl₂ of 30 times (compared with cinnamic acid (VII), and a unit ratio is mmol:mL), and ice bath blending with 10 min, and then adding N,N'-dicyclohexylcarbodiimide (DDC) of the same molal weight with cinnamic acid (VII), and ice bath blending with 10 min and then removing the ice bath, and implementing reaction 3-5 hrs under room temperature to obtain compound (IX) after separation and purification.
the reaction formula of the step 1 is:

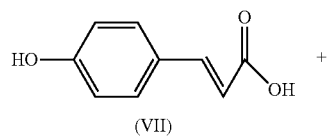

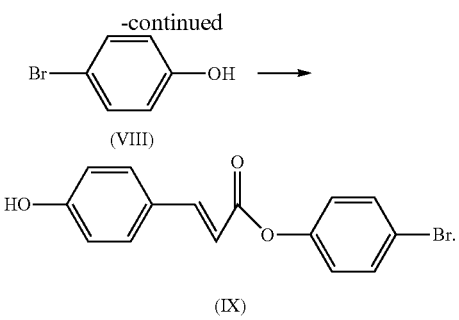

step 2, solving compound (X), compound (IX) according to a mole ratio of compound (X), compound (IX)=1:1.0-1.3 to be solved in toluene of 10 times (compared with compound (X), and a unit ratio is mmol:mL), and then adding ethanol of 5 times (compared with compound (X), and a unit ratio is mmol:mL) and 1 mol/L Na₂CO₃ solution of 2 times (compared with compound (X), and a unit ratio is mmol:mL), and purging argon with 15-30 min, and then adding little Tetrakis(triphenylphosphine)palladium, and the reaction temperature is 100-300° C., and the reaction period is 1-2 hr; obtaining compound (XI) after separation and purification.
the reaction formula of the step 2 is:

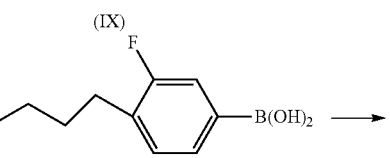

H¹-NMR data of the compound (XI) is: δ:0.96 (3H, CH₃), 1.33 (2H, CH₂), 1.29 (2H, CH₂), 1.62 (2H, CH₂), 2.55 (2H, CH₂), 7.16 (1H, benz), 7.14 (1H, benz), 7.20 (1H, benz), 7.45 (2H, benz), 7.13 (4H, benz), 6.68 (2H, benz), 6.39 (1H, CH), 7.64 (1H, CH), 5.0 (1H₂OH);

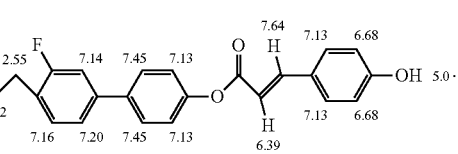

In conclusion, the present invention provides a liquid crystal material, a liquid crystal display panel and a manufacture method of a liquid crystal display panel. In the liquid crystal material of the present invention, the photosensitive vertical alignment material is mixed among the liquid crystal molecules to act the function of liquid crystal alignment. The liquid crystal display panel utilizes the aforesaid liquid crystal material. In comparison with the TN type or the STN type liquid crystal display panel, the alignment film can be eliminated to decrease the production cost. In comparison with the PSVA type liquid crystal display panel, the polymeric monomers in the PSVA liquid crystal can be eliminated, and meanwhile, one UV light process is omitted. The etching process of the pixel electrode is simplified and the production cost is decreased. In the manufacture method of the liquid crystal display panel according to the present invention, the manufacture process is simple. In comparison with the TN type or the STN type liquid crystal display panel, the alignment film can be eliminated to decrease the production cost. In comparison with the PSVA type liquid crystal display panel, one UV light process is omitted. The etching process of the pixel electrode is simplified and the production cost is decreased. The liquid crystal alignment result of the manufactured liquid crystal display panel is good.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A liquid crystal material, comprising liquid crystal molecules, and photosensitive vertical alignment material mixed among the liquid crystal molecules, and
    the photosensitive vertical alignment material is A-Sp-B-Sp-R, wherein
    A is a polar groups containing one or more of N, S, O and Si atoms;
    Sp is —CH=CH—, —C≡C—, phenyl, cycloalkyl, —O—, —S—, —CO—, —CO—O—, —OCO—, —CH$_2$S—, —CF$_2$O—, —OCF$_2$—, —CF$_2$S—, —(CH$_2$)$_n$—, an alkylene group —(CH$_2$)$_n$— having one or more CH$_2$ being replaced by a phenyl, a hexamethylene, or a cycloalkyl, or an alkylene group having one or more H atom being replaced by a F atom, wherein n is 1, 2, 3 or 4;
    B is one or more photosensitive groups, and a constitutional formula of the photosensitive group is

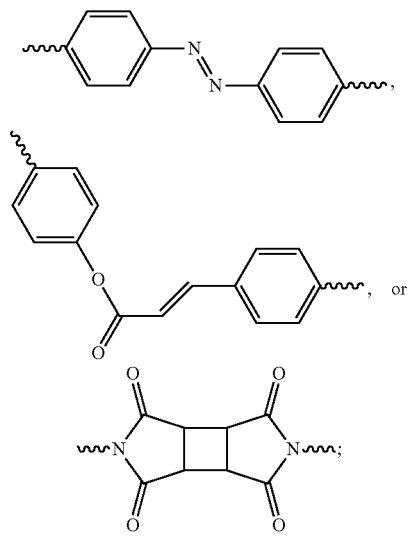

R is a linear or branched alkyl group having 5 to 20 carbon atoms, a first alkyl group having one or more CH$_2$ being replaced by a phenyl, a cycloalkyl, —CONH—, —COO—, —O—CO—, —S—, —CO— or —CH=CH—, a second alkyl group having one or more H atom being replaced by F or Cl atom, or a third alkyl group having H atom in the first alkyl group being replaced by F or Cl, wherein the photosensitive vertical alignment material is one or more of following compounds:

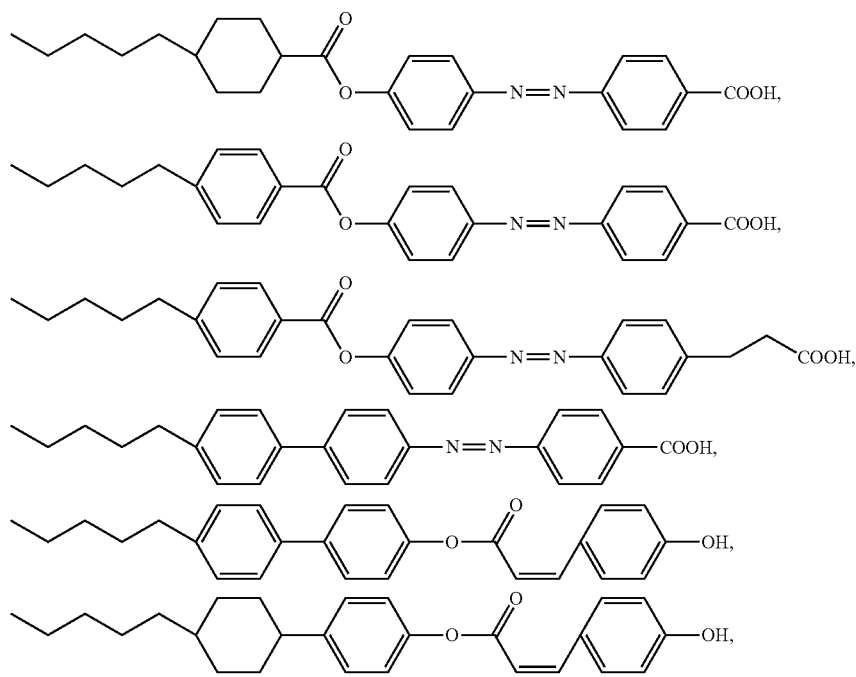

-continued

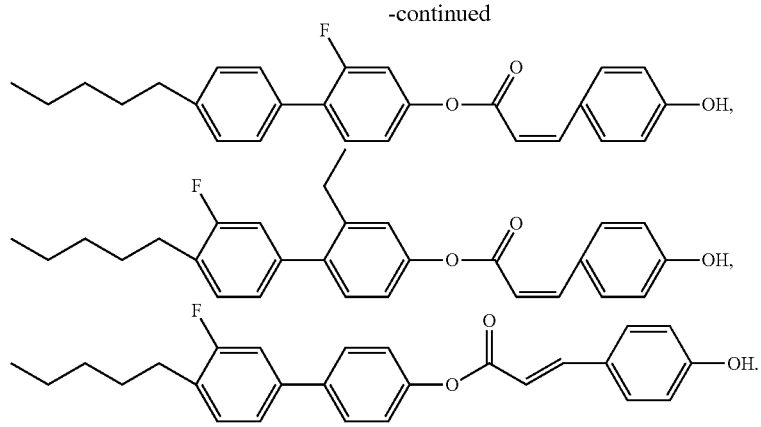

2. The liquid crystal material according to claim 1, wherein the group A is —OH or —NHR.

3. The liquid crystal material according to claim 1, wherein a mass percentage of the photosensitive vertical alignment material in the liquid crystal material is 1 wt %-5 wt %.

4. A liquid crystal display panel, comprising an upper substrate and a lower substrate which are oppositely located, and a liquid crystal layer arranged between the upper substrate and the lower substrate;
wherein the liquid crystal layer comprising the liquid crystal material according to claim 1.

* * * * *